United States Patent
Frederiksen

(10) Patent No.: US 7,134,449 B2
(45) Date of Patent: Nov. 14, 2006

(54) FLOW CONTROL VALVE WITH DEVICE FOR INDICATING THE STATUS OF A FLUID, PARTICULARLY FOR GAS CONTAINERS

(75) Inventor: Neils Frederiksen, Herlev (DK)

(73) Assignee: Cavagna Group Switzerland S.A. (CH)

( * ) Notice: Subject to any disclaimer, the term of this patent is extended or adjusted under 35 U.S.C. 154(b) by 143 days.

(21) Appl. No.: 10/892,864

(22) Filed: Jul. 16, 2004

(65) Prior Publication Data
US 2005/0229981 A1    Oct. 20, 2005

(30) Foreign Application Priority Data
Apr. 20, 2004    (IT)    ............... MI2004A0770

(51) Int. Cl.
*F16K 37/00*    (2006.01)
(52) U.S. Cl. ............ 137/557; 73/714; 73/744; 116/285
(58) Field of Classification Search ........ 116/285; 137/557; 73/714, 744; 251/284
See application file for complete search history.

(56) References Cited
U.S. PATENT DOCUMENTS

| 2,225,690 A * | 12/1940 | Ewald ............... 137/540 |
|---|---|---|
| 3,250,292 A * | 5/1966 | Mollick ............ 137/505.28 |
| 3,631,878 A * | 1/1972 | Vander Horst ......... 137/116.3 |
| 3,765,448 A * | 10/1973 | Dussia ............... 137/553 |
| 3,975,959 A | 8/1976 | Larkin |
| 4,137,942 A * | 2/1979 | Hargraves et al. ....... 137/557 |
| 4,790,821 A * | 12/1988 | Stines ............... 604/97.03 |
| 5,722,638 A | 3/1998 | Miller et al. |
| 6,182,692 B1 | 2/2001 | Fischer et al. |
| 6,273,130 B1 * | 8/2001 | Cossins ............... 137/557 |
| 2002/0063230 A1 * | 5/2002 | Cavagna ............... 251/284 |

FOREIGN PATENT DOCUMENTS

| EP | 0 869 310 A | 10/1998 |
| GB | 888 182 | 2/2001 |

\* cited by examiner

*Primary Examiner*—Eric Keasel
*Assistant Examiner*—Craig Price
(74) *Attorney, Agent, or Firm*—R. Neil Sudol; Henry D. Coleman; William J. Sapone

(57) ABSTRACT

A valve body is provided with at one end with a threaded shank for hermetic coupling to a gas container. The valve body is further provided with a handwheel incorporating a gas status indicator device. That device includes a spring-loaded plunger having a head and a helical stem that is engaged in a cavity of a rotatable body so that an axial movement of the plunger, in opposition to a spring biasing force, results in a rotation of the rotatable body. A visible portion of the rotatable body is marked so as to provide an indication of the axial position of the plunger relative to the handwheel, to thereby indicate gas pressure.

15 Claims, 4 Drawing Sheets

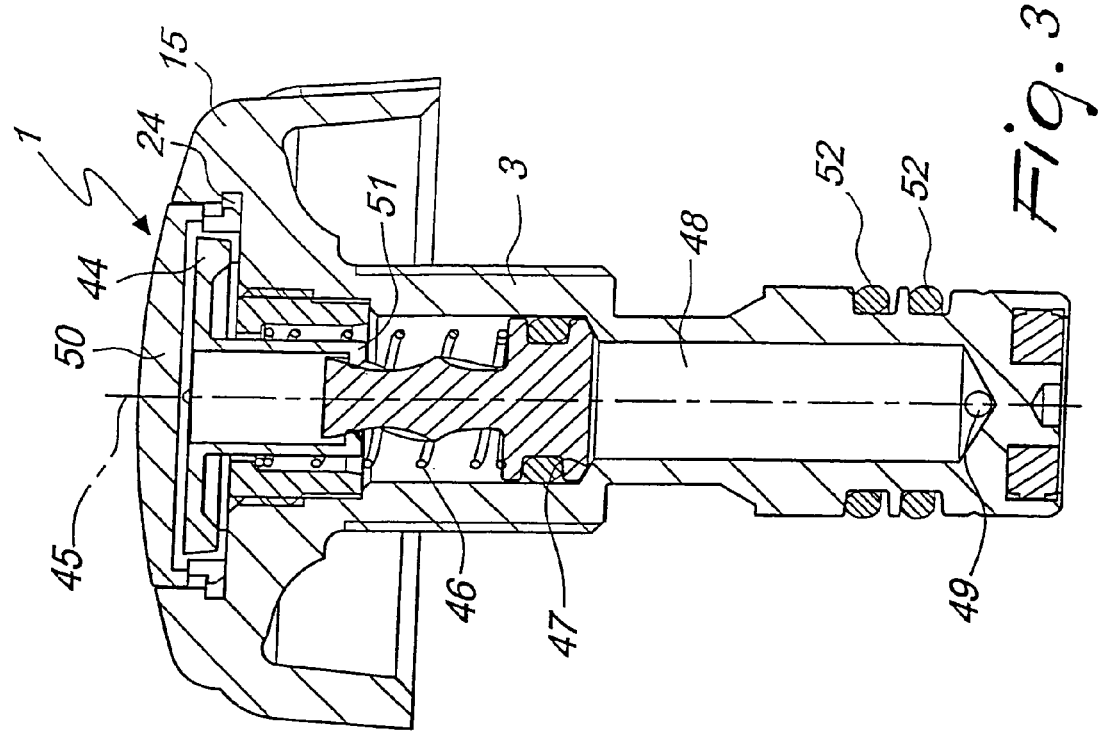
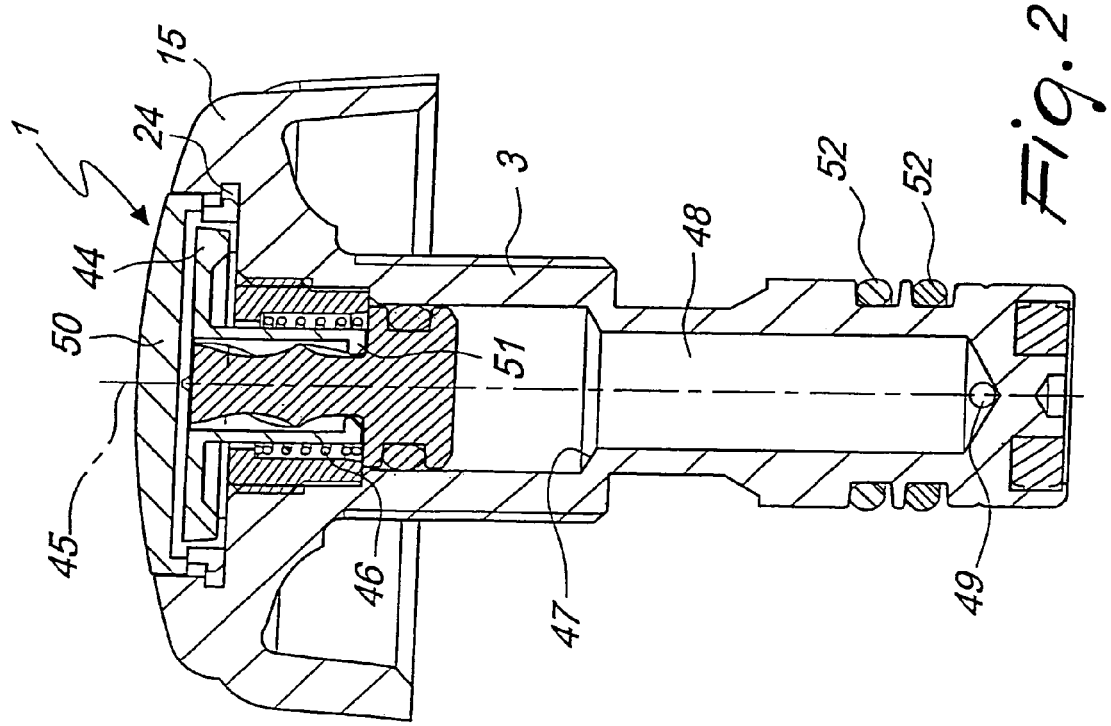

US 7,134,449 B2

FLOW CONTROL VALVE WITH DEVICE FOR INDICATING THE STATUS OF A FLUID, PARTICULARLY FOR GAS CONTAINERS

BACKGROUND OF THE INVENTION

1. Field of the Invention

The present invention relates to a flow control valve with device for indicating the status of a fluid, particularly for gas containers.

2. Description of the Prior Art

As it is known, conventional cylinders or bottles containing liquefied or compressed gases are equipped with a valve for connecting the cylinder, either directly or by means of pressure reduction units, to the user devices to be supplied.

Those conventional devices allow to separate, when required, the user devices from the cylinder in which the fluid is contained.

In order to have an indication regarding the status of the fluid inside the cylinder, it is possible, by means of a connector, to connect a pressure gauge capable of indicating the level of pressure of the fluid.

However, that type of device protrudes externally from the body of the valve and is therefore exposed to accidental impacts that can compromise its operation, drastically lowering the safety level in using the cylinder to which it is applied.

In addition to what has been described above, a pressure sensing means is also known for checking the tightness of the system components that connect the cylinder to the user devices; this means still provides for the application of devices that are external with respect to the valve.

U.S. Pat. No. 6,182,692 discloses a valve unit that includes a pressure gauge integrated in the handwheel, and EP-A-0869310 discloses a tap for gas cylinders that includes a pressure gauge integrated in the knob.

SUMMARY OF THE INVENTION

The aim of the present invention is to provide a valve equipped with a device for indicating the status of a fluid that is improved with respect to the devices of the background art.

A particular object of the invention is to provide a valve equipped with a device for indicating the status of a fluid that withstands pressures even several times higher than the measurement interval for which the device is designed.

A further object of the invention is to provide a valve equipped with a device that can be adapted to different gases.

A further object is to provide a valve in which the status indication device is capable of giving an indication of the quantity of fluid contained in the cylinder without requiring the presence of external components, ensuring higher safety and practicality in use.

A further object is to provide a valve equipped with a device that allows to monitor the status of the system that connects the cylinder on which it is installed to the user devices, again without requiring the presence of additional components in the system.

A further object is to allow the replacement, if necessary, of the pressure sensing means without requiring complete removal of the flow control valve from the cylinder.

A further object of the invention is to provide a valve that can be obtained by assembling components that are easily available and low in cost, so as to ensure an advantage on a purely economic level.

This aim and these and other objects that will become better apparent hereinafter are achieved by a flow control valve with device for indicating the status of a fluid, particularly for gas containers, comprising a body provided with an end on which a threaded shank is provided for hermetic coupling to a gas container, and a handwheel, characterized in that a gas status indicator device is included within the handwheel, the device comprising a plunger that is constituted by a head and by a helical stem that is engaged in a cavity of a body that can rotate so that an axial movement of the plunger is matched by a rotation of the rotatable body, which has a visible portion that is marked so as to provide an indication of the status of the plunger, which can move, in contrast with a calibrated spring, between at least one minimum position, in which the head abuts against a shoulder, due to the action of the calibrated spring, and a maximum position, in which the plunger abuts against an end of the rotatable body.

BRIEF DESCRIPTION OF THE DRAWINGS

Further characteristics and advantages of the present invention will become better apparent from the following detailed the description of preferred but not exclusive embodiments thereof, illustrated by way of nonlimiting example in the accompanying drawings, wherein:

FIG. 2 is a sectional elevation view, taken along a longitudinal plane, of the device applied to a tap, shown in the maximum-pressure position with the piston in the "packed" configuration;

FIG. 3 is a view, similar to FIG. 2, of the device in the minimum- or zero-pressure position;

DESCRIPTION OF THE PREFERRED EMBODIMENTS OF THE INVENTION

Figure 1:
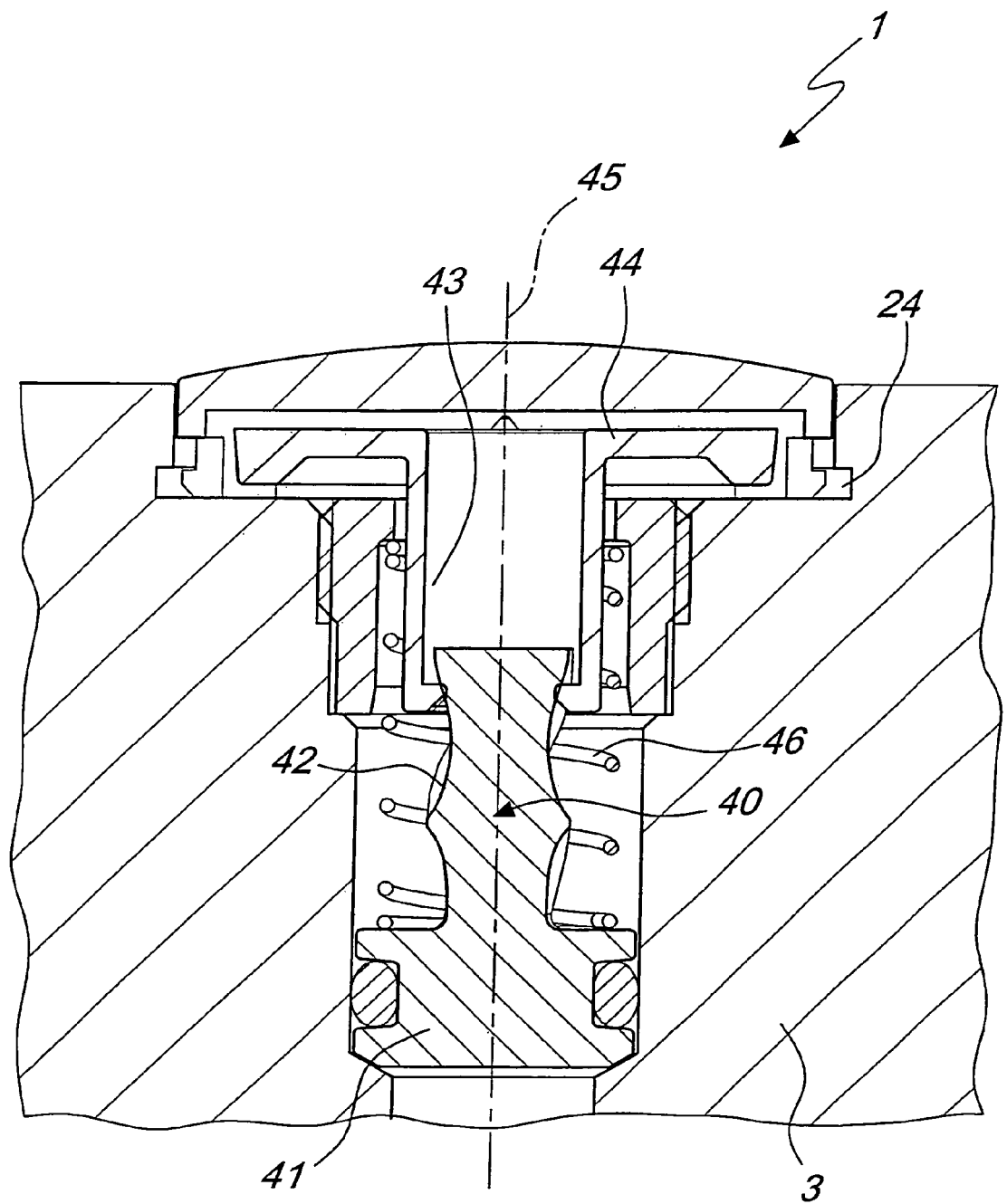
FIG. 1 is a sectional elevation view, taken along a longitudinal plane, of a device according to the invention.

With reference to the figures cited above, a valve according to the invention, generally designated by the reference numeral 100, includes a body 2, which has an end 21 on which a threaded shank 4 is provided for hermetic coupling to a cylinder, not shown in the figures.

The body 2 includes a region 5, which provides an hermetic connection to the system for supplying the user devices, which is not visible in the figures.

A first feed duct 9 is formed inside the shank 4, and a second feed duct 10 is formed inside the region for connection to the user devices; the ducts allow the passage of the fluid that arrives from the cylinder and is directed to the user devices.

The ducts 9 and 10 are connected by means of a passage 12, which is formed in the region where they intersect.

Figure 4:
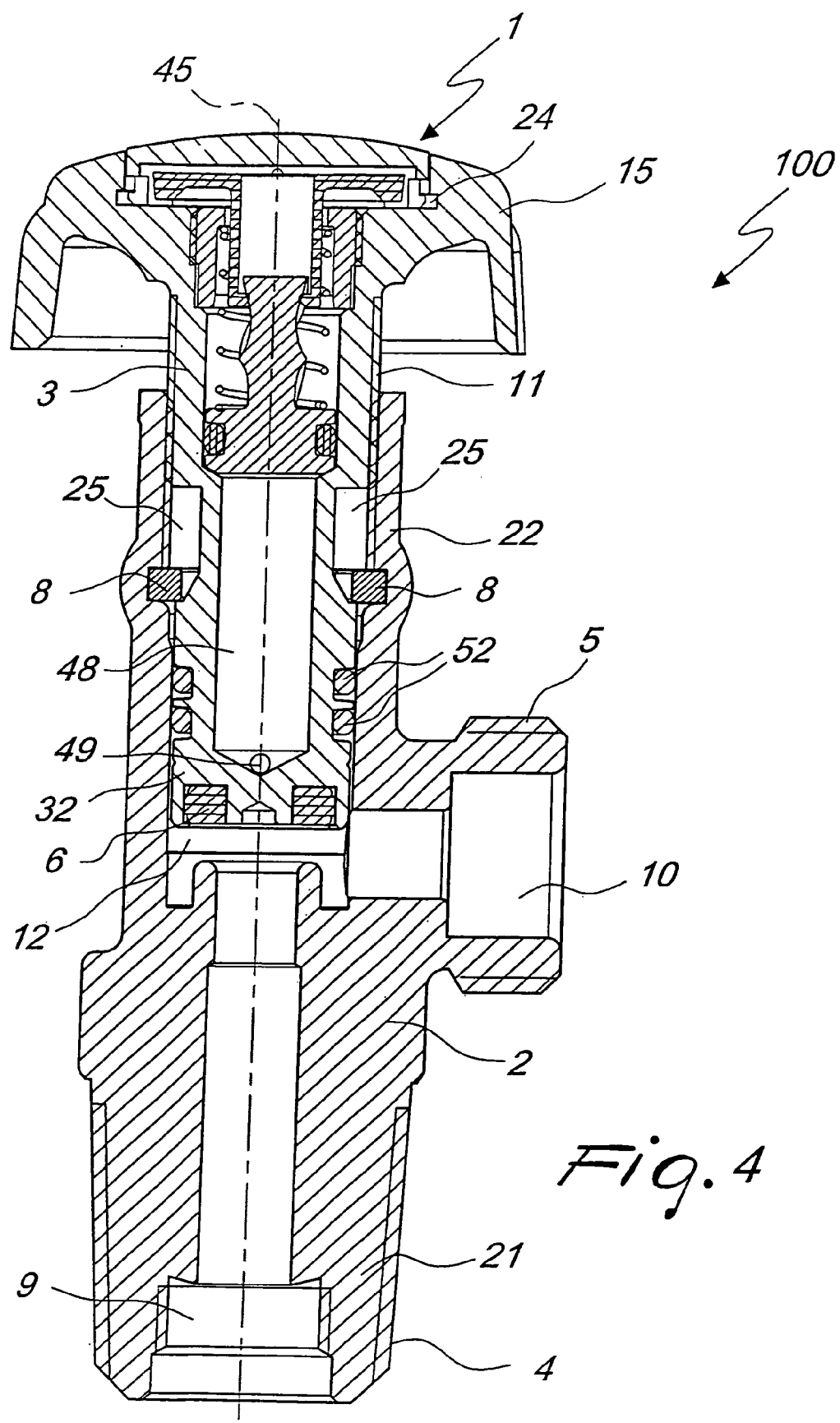
FIG. 4 is a sectional elevation view, taken along a longitudinal plane, of the device applied to a plug valve for a gas cylinder.

The body 2 has a region 22 inside which a piston 3 is accommodated; the piston forms a movable closure member, which is capable of passing from an open position, in which the ducts 9 and 10 are mutually connected by the passage 12, as shown in FIG. 4, and a flow control or closure position, in which the passage is no longer present, interrupting the connection between the ducts 9 and 10, and vice versa.

In the embodiment described here, the movable member 3 includes a handwheel 15 and can slide within the body 2 by means of a threaded coupling 11.

The moveable member 3 includes a flow control portion 32, which closes the duct 9 hermetically by means of the gasket 6, blocking the passage 12 and preventing the flow of the fluid contained in the cylinder towards the duct 10.

According to the invention, the handwheel 15 includes the device 1 internally and has for this purpose, in the illustrated example, a cavity 24 suitable to accommodate the device 1. The handwheel 15 serves as a casing of the device 1.

The device 1 according o the invention includes a plunger 40, which is constituted by a head 41 and by a helical stem 42, which engages a cavity 43 of a rotating body 44 so that a translational motion of the plunger 40, which cannot rotate about the longitudinal axis 45 and is thus rotationally fixed to handwheel 15, is matched by a rotation of the rotatable body 44.

The movement of the plunger 40 is in opposition to a force exerted by a spring 46, which is mounted coaxially with respect to the stem 42, so as to push the head 41 of the plunger 40 in abutment against a shoulder 47, which is formed along an axial chamber 48, which in turn is formed in the movable member 3.

The axial chamber 48 is connected to the ducts 9 and 10 by a radial channel 49.

The rotatable body 44 can rotate within the cavity 24, which is closed upward by a transparent dome 50.

The pressure that is present inside the ducts 9 and 10 determines the axial position of the plunger 40, which has two end positions, one for pressure below a certain limit, shown in FIG. 3, in which the spring 46 pushes the head 41 into abutment against the shoulder 47, and one for maximum pressure, shown in FIG. 2, in which the head 41 abuts against the end 51 of the rotatable body 44.

The device 1 is therefore capable of measuring the pressure inside the ducts 9 and 10 in an interval that depends on the calibration of the spring 46.

Two annular gaskets 52, for example of the O-ring type, are provided above the channel 49, between the movable member 3 and the body 2, in order to isolate the upper part of the movable member 3.

A tangent pin 8, accommodated in a groove formed within the region 22 of the body 2, limits the movement of the movable member 3 between the fully open position of the valve and the closed position, by abutting against the walls of an appropriately provided cavity 24 formed along the movable member 3.

The device according to the invention is capable of giving an indication of the amount of gas that is present in a cylinder by showing the variation on a "dial", which in the specific case is constituted by the upper surface of the rotatable body 44, of some sort of indicator, colors, numbers, or geometric shapes.

By combining the reading of the pressure taken by the device with the temperature and with an average of consumption, it is possible, through the calibration of the internal spring 46, to achieve operation for the chosen pressure deltas.

In this manner, the device according to the invention can be adapted to different gases.

An important characteristic of the present invention is that it can be subjected without damage to hydraulic tightness tests usually performed at a much higher pressure, ten to fifty times higher, than the operating range for which the spring 46 is calibrated.

This is due to the fact that once a certain pressure threshold is exceeded, the head 41 of the plunger 40 abuts against the end 51 of the rotatable body 44, so that the overpressure does not damage the calibrated spring 46.

The device according to the invention can be arranged upstream or downstream of the main seal, and in this case monitoring changes from continuous to operation only when the valve is open.

When the device is arranged downstream of the main seal, if the valve is closed, it detects the presence of leaks in the user device line part.

The device can be positioned in any point of a valve, of a line or of a flow control and pressure reduction device.

Figure 5:
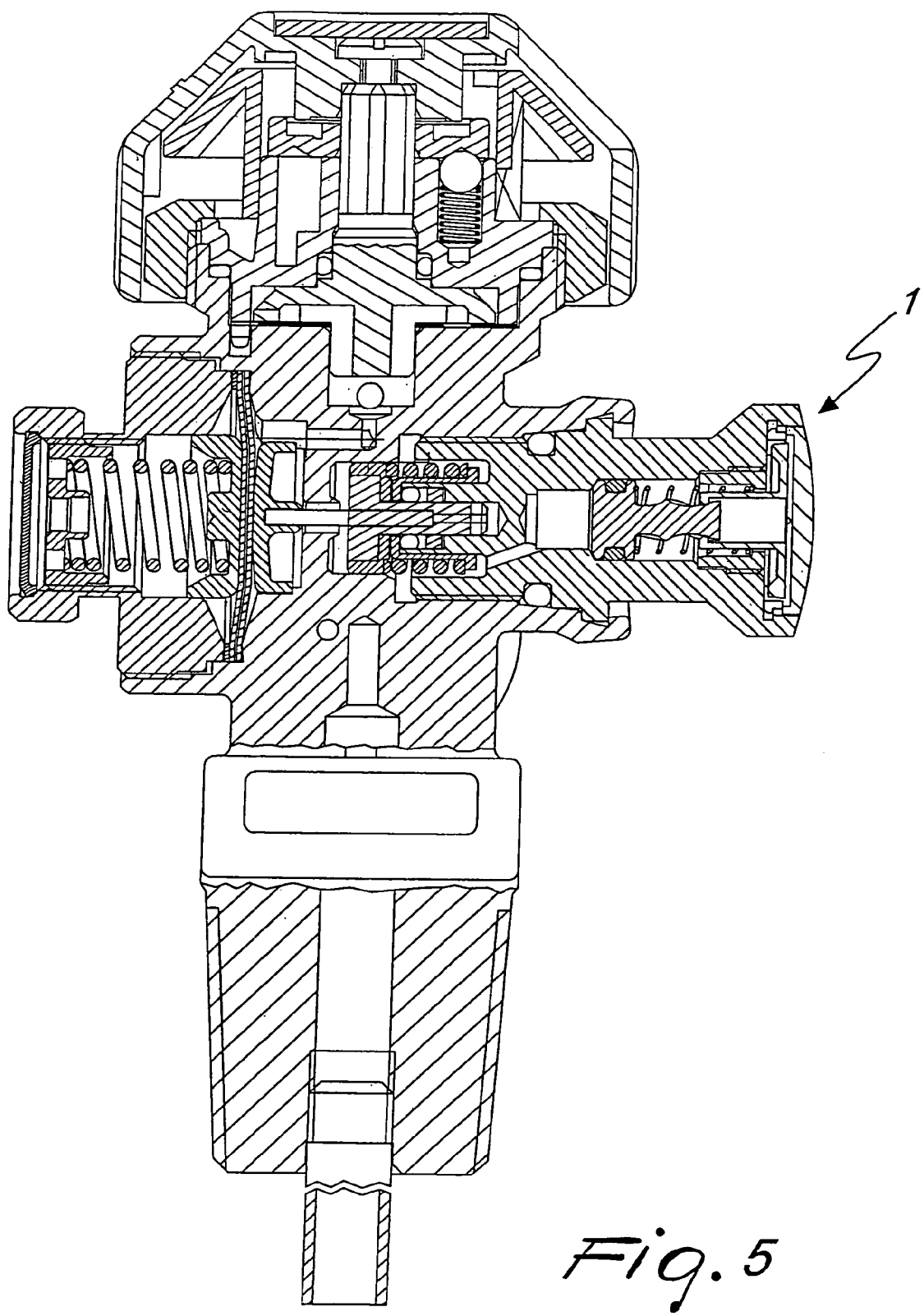
FIG. 5 is a sectional elevation view of a high-pressure valve provided with the device according to the invention.

FIG. 5 in fact illustrates a different application, among the many possible ones, of the device according to the invention.

Another advantage of the device according to the invention is the possibility to manage its dimensions independently of the indicated delta P values.

Another possibility offered by the device is to vary the sensitivity of the indication within a delta P by varying the winding pitch of the helix of the stem 42.

The device can be arranged inside the movable member, which constitutes the handwheel, also by way of the presence of the tangent locking pin 8, which allows a considerable reduction in space occupation and complete accessibility to the interior.

In practice it has been found that the invention achieves the intended aim and objects by providing a valve that is improved with respect to hitherto known devices and with advantages also from the production standpoint, since it is produced with a reduced number of components, with consequent economic advantages with respect to known indication methods.

The valve according to the invention is susceptible of numerous modifications and variations, within the scope of the appended claims. All the details may be replaced with technically equivalent elements.

The materials used, as well as the dimensions, may of course be any according to requirements and to the state of the art.

What is claimed is:

1. A flow control valve with means for indicating the status of a fluid, particularly for gas containers, comprising a valve body provided with an end on which a threaded shank is provided for hermetic coupling to a gas container, and a handwheel, a gas status indicator device being comprised within the handwheel, said handwheel forming a casing of said device, said device comprising a plunger that is constituted by a head and by a helical stem that is engaged in a cavity of a rotatable body that can rotate so that an axial movement of said plunger is matched by a rotation of said rotatable body, which has a visible portion that is marked so as to provide an indication of the status of the plunger, which can move axially, in opposition to a force exerted by a calibrated spring, between at least one minimum position, in which said head abuts against a shoulder, due to the action of said calibrated spring, and a maximum position, in which said plunger abuts against an end of said rotatable body, said plunger being rotationally fixed to said handwheel so that said device rotates with said handwheel, said handwheel having a cavity that accommodates said plunger and said rotatable body.

2. The valve according to claim 1, comprising a region that provides a hermetic connection to the user device supply system.

3. The valve according to claim 2, comprising a first feed duct is formed inside said shank and a second feed duct is formed inside said region for connection to the user devices, said ducts allowing the passage of the fluid that arrives from said container and is directed toward the user devices.

4. The valve according to claim 3, wherein said ducts are connected through a passage that is formed in the region where they intersect.

5. The valve according to claim 4, wherein said valve body has a region inside which a piston portion of said handwheel is accommodated, said piston forming a movable closure member that is capable of passing from an open position, in which said ducts are mutually connected through said passage, and a position for flow control or closure, in which said passage is no longer provided, interrupting the connection between said ducts, and vice versa.

6. The valve according to claim 5, wherein said movable closure member can slide within the body by means of a threaded coupling.

7. The valve according to claim 6, wherein said movable closure member comprises a flow control portion, which closes said passage hermetically, by means of a gasket, obstructing said passage and preventing the flow of the fluid contained in the container toward the second feed duct.

8. The valve according to claim 1, wherein the movement of said plunger is opposed by said spring, which is mounted coaxially to the stem so as to push the head of the plunger into abutment against said shoulder, said shoulder being formed along an axial chamber of said cavity.

9. The valve according to claim 8, wherein said axial chamber is connected to said ducts by a radial channel.

10. The valve according to claim 9, wherein said rotatable body can rotate inside said cavity, which is closed in an upper region by a transparent dome.

11. The valve according to claim 10, wherein the pressure that is present in the ducts determines the position of the plunger in an axial direction, said plunger having two extreme positions, one for pressure below a certain limit, in which said spring pushes said head into abutment against said shoulder, and one for maximum pressure, in which said head abuts against the end of the rotatable body.

12. The valve according to claim 11, wherein the measurement of the pressure inside the ducts lies within an interval that depends on the calibration of the spring.

13. The valve according to claim 12, further comprising two annular gaskets above the channel, between the handwheel and the valve body, in order to isolate an upper part of the handwheel.

14. The valve according to claim 13, further comprising a tangential pin, which is accommodated in a groove formed inside the valve body and is adapted to limit the movement of the handwheel between the fully open position of the valve and the closed position.

15. The valve according to claim 1, wherein a pressure delta within which the device operates is determined by calibrating the spring.

* * * * *